United States Patent [19]

Sinnig

[11] Patent Number: 4,773,870
[45] Date of Patent: Sep. 27, 1988

[54] PULL-OUT FRAME WITH A PROTECTIVE PLATE FOR A BREAK-CONTACT ARRANGEMENT

[75] Inventor: Fred Sinnig, Berlin, Fed. Rep. of Germany

[73] Assignee: Siemens Aktiengesellschaft, Munich, Fed. Rep. of Germany

[21] Appl. No.: 937,930

[22] Filed: Dec. 4, 1986

[30] Foreign Application Priority Data

Dec. 13, 1985 [DE] Fed. Rep. of Germany ....... 3544667

[51] Int. Cl.$^4$ ............................................ H01R 13/44
[52] U.S. Cl. .................................. 439/136; 439/145; 200/50 AA
[58] Field of Search ........................ 339/45, 46, 75, 36, 339/37, 40, 42, 125; 361/346, 349, 392, 393; 200/50 AA

[56] References Cited

U.S. PATENT DOCUMENTS 3,614,350  10/1971  Eichelberger ................. 200/50 AA
4,443,676   4/1984  Castonguay ................... 200/50 AA
4,447,682   5/1984  Castonguay ........................ 361/345

FOREIGN PATENT DOCUMENTS 0061129  9/1982  European Pat. Off. ............ 361/345
8512452  6/1985  Fed. Rep. of Germany .
2098742  3/1972  France .
0121943  9/1979  Japan ................................. 361/345
0131737 10/1979  Japan ................................. 361/345

Primary Examiner—David Pirlot
Attorney, Agent, or Firm—Kenyon & Kenyon

[57] ABSTRACT

A pull-out frame has drivers which are movably guided in a straight line at side walls, with a working surface which interacts with a working surface of a lifting lever which likewise is supported tiltably at the side walls. Interacting hook-like end parts of the driver and the lifting lever block, in the rest condition, tilting of the lifting lever. If required, end faces of the end parts of the driver and of the lifting lever meet each other in order to exert an additional restoring force on the lifting lever.

5 Claims, 1 Drawing Sheet

PULL-OUT FRAME WITH A PROTECTIVE PLATE FOR A BREAK-CONTACT ARRANGEMENT

BACKGROUND OF THE INVENTION

The present invention relates to a pull-out frame for a movably arranged switchgear with a stationary break-contact arrangement protected against electrical shorting by a protective plate, having the following features:

the protective plate is guided movably vertically by guides;

for actuating the protective plate, a device for transforming part of the travel distance of the switchgear into a lifting motion of the protective plate is provided;

the device comprises a driver acted upon by a restoring force, as well as a stationary supported lifting lever cooperating therewith; and the driver and the lifting lever have working surfaces facing each other.

A pull-out frame with these features is known from U.S. Pat. No. 4,443,676. The force required for shifting the protective plate is transmitted here by a spring which is arranged between the driver and the lifting lever. Only if the protective plate is blocked do oppositely disposed working surfaces of the driver and the lifting lever come into contact with each other and limit the path of the driver. Because the force is transmitted to the lifting lever by means of the spring, it is difficult to maintain a given relationship between the motion of the driver and the motion of the protective plate.

SUMMARY OF THE INVENTION

In this connection it is an object of the invention to bring about a forced dependence between the actuation of the driver and the motion of the protective plate and, in addition, to make do with a part of the travel distance of the switchgear as small as possible for the actuation of the protective plate.

According to the invention, the above and other objects are achieved by the following features:

the driver is guided at a side wall of the pull-out frame movably in a straight line in the direction of travel of the switchgear;

the working surfaces are designed as the sole means for transmitting force between the driver and the lifting lever, and the driver and the lifting lever have end pieces designed for cooperation in a form-locking manner for blocking the lifting lever in the rest condition of the device. The form-locking connection prevents an excessive displacement of the protective plate if only one of customarily two identical devices provided is actuated. By suitable design of the working surfaces it can further be achieved that a surprisingly small part of the travel distance which is less than 1 cm causes a stroke of the protective plate of about 3 cm or more with great accuracy if the process is repeated.

The mentioned form-locking cooperation between the end parts of the driver and the lifting lever can be achieved by the provision that the end parts are designed engaging each other in hook-fashion and that the coverage of the end parts corresponds to a displacement of the driver which must be traveled starting from the rest condition until the working surfaces touch each other. This means that part of the working travel of the driver is used for latching or unlatching the device and that the lifting motion of the protective plate can start only immediately after the release of the lifting motion of the protective plate.

It is further found to be advantageous if the driver, following its working surface has a support surface for taking up without reaction a force acting on the lifting lever. It is achieved thereby that the weight of the protective plate in the lifted position does not exert a restoring force on the driver but is transmitted to the pull-out frame via the driver and its guiding elements. It has been found that the support surface can be formed by an outer surface of the hook-like end part facing the lifting lever.

For the operation of the device it is advantageous if the pivot of the lifting lever is arranged in a plane lying above the support surface of the driver and if the hook-like end parts of the driver and the lifting lever have mutually opposite end faces. In this manner a restoring force acting in addition to the weight of the protective plate is exerted from the restoring motion of the driver in order to return the former to the starting position, if the motion resistance of the protective plate is increased for any reason.

As already mentioned, the driver is guided in the pull-out frame movably in a straight line. In connection therewith, the driver can be designed as extending in its rest position up to the forward edge of the pull-out frame on the operating side and may have near its end an opening for a protection member blocking the driver against actuation. For this purpose, a padlock can be used in a manner known per se, the U-shaped bar of which is brought through the opening of the driver and an opening in the pull-out frame corresponding therewith.

BRIEF DESCRIPTION OF THE DRAWINGS

The invention will be explained in greater detail in the following detailed description with reference to the drawing figures, in which.

DETAILED DESCRIPTION

Figure 1:
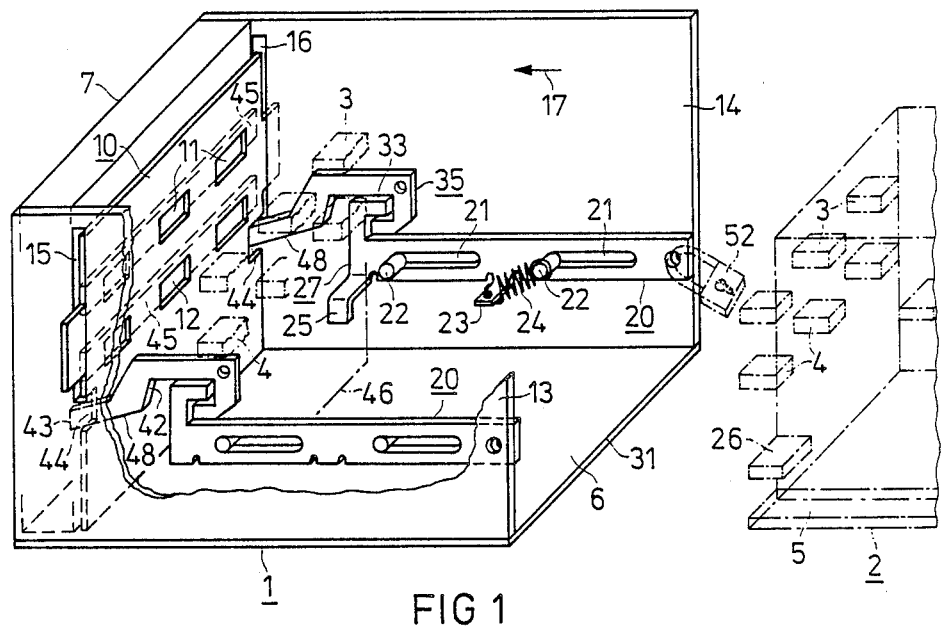
FIG. 1 shows a pull-out frame with a device for actuating a protective plate in a simplified perspective view, with a low-voltage circuit breaker indicated schematically.

The pull-out frame 1 shown in the figures serves for accommodating a low-voltage circuit breaker 2, on the back side of which bar-like contacts 3 and 4 are arranged. Three upper contacts 3 and three further, lower contacts 4 are arranged in parallel rows, an upper contact 3 and a lower contact 4 belonging to one pole of the circuit breaker. For guiding the pull-out frame 1, the circuit breaker 2 is provided with base angles 5 which are suitable for sliding on a bottom plate of the pull-out frame 1 or on guides specially provided for this purpose. For connecting the circuit breaker 2 to stationary conductors is provided a break contact arrangement 7 which is arranged on the back side of the pull-out frame 1 and contains the break contact blocks designed to cooperate with the contacts 3 and 4. Suitable for this purpose are, for instance, break contact blocks according to U.S. Pat. No. 4,486,636. The break contact arrangement 7 is preceded by a protective plate 10 which has openings 11 for the upper contacts 3 of the circuit breaker 2 and lower openings 12 for the lower contacts 4. At the side walls 13 and 14 of the pull-out frame 1, guide slots 15 and 16 for the vertical guidance of the protective plate 10 are arranged.

In the rest position of the protective plate 10 shown in FIG. 1, the break contact blocks of the break contact arrangement 7 are covered up. Thereby, the required protection against contact with voltage-carrying parts in the pull-out frame 1 is assured. The device to be described in the following serves to cause an automatic lifting of the protective plate 10, when the circuit breaker 2 is inserted in the direction of the arrow 17; that the contacts 3 and 4 of the circuit breaker 2 can pass through the openings 11 and 12 of the protective plate 10 and come into engagement with the plate contact blocks located therebehind. For this purpose, a driver 20 is provided at each of the side walls 13 and 14 of the pull-out frame 1, which has two elongated holes for guidance on a straight line on posts 22 inserted into the side walls. Between one of the posts 22 and a bent-off tab 23 of the driver 20, a tension spring 24 is hooked as the restoring spring for the driver 20. At the inner end of the driver 20, an extension 25 protruding into the interior of the pull-out frame 1 is fastened which cooperates with a suitable countersurface of the circuit breaker 2. As an example for this, a stop 26 arranged for this purpose is shown here in FIG. 1 above the base angle 5.

Likewise at its inward end, the driver 20 is provided with a hook-like end piece 27 which forms an entrance opening 30, an end face 32 pointing toward the front edge 31 of the pull-out frame 1 as well as an outer support surface 33. The end part 27 further has a backward working surface 34.

Likewise at each of the side walls 13 and 14 of the pull-out frame 1, a lifting lever 35 is pivoted on a pin 36. This pivot bearing is located in a plane disposed above the support surface 33 of the end part 27 of the driver 20, in order to bring about cooperation, yet to be explained, between the driver 20 and the lifting lever 35 in the case of a disturbance. The lifting lever 35 likewise has a hook-like end part 37 which forms an entrance opening 40 pointing toward the interior of the pull-out carrier 1 as well as an end surface 41. Opposite the entrance opening 40, the lifting lever 35 has a working surface 42 which cooperates with the working surface 34 of the driver 30. With its rear end part 43, each lifting lever 35 engages a lateral recess 44 of the protective plate 10. By tilting the lifting lever 35 about its pivot pin 36, the protective plate 10 can be lifted from the rest position shown in FIG. 1 into the operating position shown in FIG. 2. The openings 11 and 12 of the protective pivot 10 arrive here via the protective strips 45 indicated by dashed lines in FIG. 1, to permit the passage of the contacts 3 and 4 of the circuit breaker 2 to the break contact arrangement 7.

Figure 2:
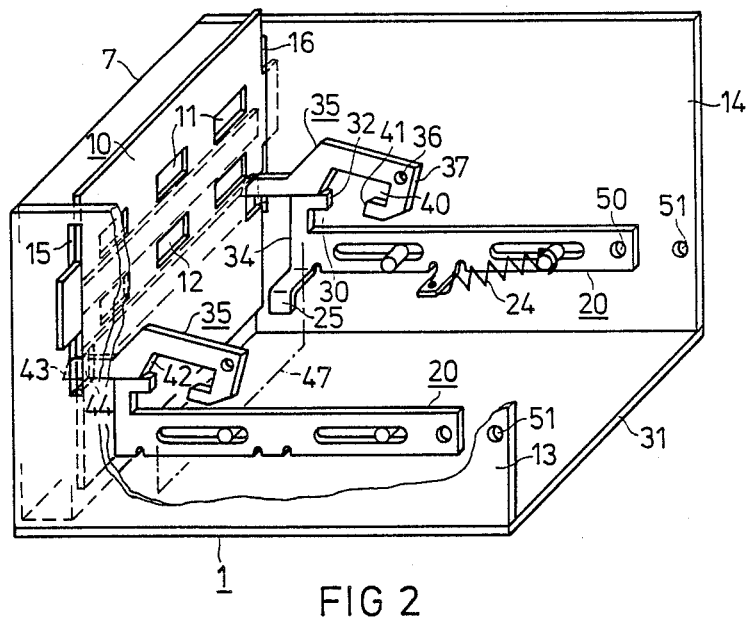
FIG. 2 shows the pull-out frame according to FIG. 1 with the protective plate lifted, without the circuit breaker.

When inserting the circuit breaker 2 into the pullout frame 1 in the direction of the arrow 17, the latter's stops 26 arrive at the position indicated by the dashed-dotted line 46 indicated in FIG. 1, in contact with the extensions 25 of the drivers 20. Indicated likewise dashed-dotted are the contacts in this position. Upon further motion of the circuit breaker 2, the drivers 20 are likewise shifted, their hook-like end parts 27 come out of engagement with the hook-like end parts 37 of the lifting levers 35. Thereby, the lifting levers 35 are released and can be tilted. This is accomplished by the interaction of the working surfaces 34 on the side of the end parts 27 of the drivers 20 facing the protective plate 10 with the working surfaces 42 of the lifting levers 35. Through a suitable choice of the angular position of these working surfaces it can be accomplished that the tilting motion of the lifting levers 35 required for lifting the protective plate 10 is brought about on a relatively short part of the travel distance of the circuit breaker 2. In this manner, a high degree of operating reliability is achieved, since only then, the protective plate 10 is lifted and the passage to the break contact arrangement 7 is released if the contacts 3 and 4 of the circuit breaker 3 are located immediately in front of the protective plate 10. Contact with voltage-carrying parts is thereby made impossible. FIG. 2 shows the parts in their end position. The position of the circuit breaker 2 is marked here by a dashed-dotted line 47.

The working surface 42 of the lifting lever 35 is designed so that it slides off the working surface 34 of the driver 20 as soon as the protective plate 10 has reached its operating position. Then, the underside 48 of each lifting lever 35 gets to the support surface 33 of each driver 20, whereby the weight of the protective plate 10 is taken up without reaction to the position of the driver 20. For returning the device into the starting position shown in FIG. 1, the power of the coil springs 24 alone is the governing factor.

If the circuit breaker 2 is removed from the pull-out frame 1, the drivers 20 follow at first the movement of the circuit breaker 2 under the influence of the force of the coil springs 24. In the process, the end part 43 of the lifting levers 35 slides off the support surfaces 33 of the drivers 20 until the working surfaces 34 and 42 come into contact again. This corresponds to the position of the circuit breaker 2, in which its contacts 3 and 4 have left the break contact arrangement 7 as well as the openings 11 and 12 of the protective plate 10. Due to the design of the working surfaces 34 and 42, the lifting levers 35 now execute again on a short part of the travel distance of the circuit breaker 2 the tilting motion required for lowering the protective plate 10. Subsequently, the end part 27 of each driver 20 enters the entrance opening 40 of each lifting lever 35, while the end part 37 of each lifting lever 35 arrives in the entrance opening 30 of the corresponding driver 20. Thereby, the formlocking connection is re-established, by which a displacement of the protective plate 10 independent of the drivers 20 is prevented.

In case the motion resistance of the protective plate 10 during the removal of the circuit breaker 2 is increased by whatever influences, for instance, if the protective plate is jammed in the guide rails 15 or 16 or both, an additional restoring force is exerted when the end faces 32 and 41 of the drivers 20 and the lifting levers 35 meet each other. To this end, the force of the restoring springs 24 are transmitted via the drivers 20 to the lifting levers 35 by a lever arm which corresponds to the distance of the end faces 41 from the pivot pin 36. To increase the operating safety further, it may be desirable to prevent the actuation of the described device independently of the insertion of a circuit breaker or to bring about additionally a blocking of the insertion of a circuit breaker. To this end, the drivers 20 are designed so that they extend to the front edge 31 of the pull-out frame 1 and have an opening 50 there. A further opening 51 is provided in each of the side walls 13 and 14 of the pull-out frame 1. The openings 50 and 51 correspond to each other if the drivers 20 are in the rest position according to FIG. 1. If now the shackle of a padlock 52 is brought through the openings 50 and 51 as indicated in FIG. 1, the respective driver 20 is blocked against actuation. At the same time, the padlock 52 forms an obstacle against the insertion of the circuit breaker 2. Additional security can be achieved by a further padlock at the side walls 13.

As the description above shows, the device for operating the protective plate 10 can be used independently of any special design of the pull-out frame 1. Also the circuit breaker 2 can be of any suitable type of design since it is merely necessary that an edge or working surface cooperating with the extension 25 of the drivers 20 is provided. A separate stop corresponding to the stop 26 in FIG. 1 is therefore not absolutely necessary.

In the foregoing specification, the invention has been described with reference to a specific exemplary embodiment thereof. It will, however, be evident that various modifications and changes may be made thereunto without departing from the broader spirit and scope of the invention as set forth in the appended claims. The specification and drawings are, accordingly, to be regarded in an illustrative rather than in a restrictive sense.

What is claimed is:

1. A pull-out frame for a switchgear arranged movably, having a stationary break-contact arrangement comprising:
   a protective plate for securing the contact arrangement against electrical shorting vertically movable in guide means between a first rest position and a second operating position;
   means for actuating the protective plate comprising means for transforming part of a travel distance of the switchgear into a lifting motion of the protective plate;
   driver means responsive to a restoring force and a lifting lever stationarily supported cooperating with the driver means;
   said driver means and lifting lever having working surfaces facing each other;
   said driver means being guided at a side wall of the pull-out frame and movable in a straight line in a direction of the travel path of the switchgear;
   the working surfaces comprising the sole means for transmitting the force between the driver means and the lifting lever; and
   the driver means and the lifting lever having hooklike end parts cooperating in a form-locking manner in the rest position of the device for blocking the lifting lever and the overlap of the end parts corresponding to a displacement of the driver to be traveled, starting from the rest position until contact is made by the working surfaces.

2. The pull-out frame recited in claim 1, wherein the driver means has a support surface adjacent the working surface thereof, the support surface supporting the weight of the protective plate as transmitted through the lifting lever when the pull-out frame is in the second operating position.

3. The pull-out frame recited in claim 1 wherein the support surface comprises an outside surface of the hook-like end part facing the lifting lever.

4. The pull-out frame recited in claim 1 wherein the lifting lever has a pivot bearing which is arranged in a plane lying above the support surface of the driver means, and the hooklike end parts of the driver means and the lifting lever have end faces opposite each other.

5. The pull-out frame recited in claim 1, wherein the driver means in its rest position extends up to a front edge of the pull-out frame on an operating side, and has near an end thereof an opening for a securing member blocking the driver means against actuation.

* * * * *